United States Patent [19]

Nolan et al.

[11] Patent Number: 5,224,638
[45] Date of Patent: Jul. 6, 1993

[54] INDUCTION SEVERING APPARATUS

[75] Inventors: John H. Nolan, Mt. Clemens; Richard Hartmann, Jr., Brighton; John Graham, Sterling Heights, all of Mich.

[73] Assignee: Alpha Industries, Inc., Novi, Mich.

[21] Appl. No.: 569,958

[22] Filed: Aug. 20, 1990

[51] Int. Cl.⁵ .............................................. B26F 3/06
[52] U.S. Cl. ...................................... 225/2; 225/93.5; 225/101
[58] Field of Search ...................... 225/100, 101, 93.5, 225/2; 219/10.41, 10.43, 8.5, 68

[56] References Cited

U.S. PATENT DOCUMENTS

| | | | |
|---|---|---|---|
| 3,068,336 | 12/1962 | Tamm | 225/100 X |
| 3,958,732 | 5/1976 | Aoyama et al. | 225/93.6 X |
| 4,113,162 | 9/1978 | Boehm et al. | 225/93.5 X |
| 4,228,706 | 10/1980 | Borzym | 83/320 |
| 4,294,147 | 10/1981 | Borzym | 83/382 |
| 4,343,209 | 8/1982 | Moelbert | 83/16 |
| 4,537,102 | 8/1985 | Balzer | 83/16 |
| 4,670,636 | 6/1987 | Taub et al. | 225/93.5 X |
| 4,768,694 | 9/1988 | Fabris et al. | 225/100 X |
| 4,916,278 | 4/1990 | Rudd et al. | 219/10.41 |

FOREIGN PATENT DOCUMENTS

| | | | |
|---|---|---|---|
| 554095 | 4/1977 | U.S.S.R. | 225/101 |
| 578166 | 10/1977 | U.S.S.R. | 225/93.5 |

*Primary Examiner*—Douglas D. Watts
*Assistant Examiner*—Rinaldi Rada
*Attorney, Agent, or Firm*—Krass & Young

[57] ABSTRACT

An apparatus and method for severing a workpiece wherein the workpiece is clamped at two axially spaced apart locations, and heated to reduce the tensile strength of the material, after which the axial spacing between the clamps is increased to pull the workpiece apart in the heated area. This apparatus and method may also be used in a flying environment; i.e., the severing apparatus travels with the workpiece to sever sections of a workpiece continuously emanating from a fabrication mill.

29 Claims, 8 Drawing Sheets

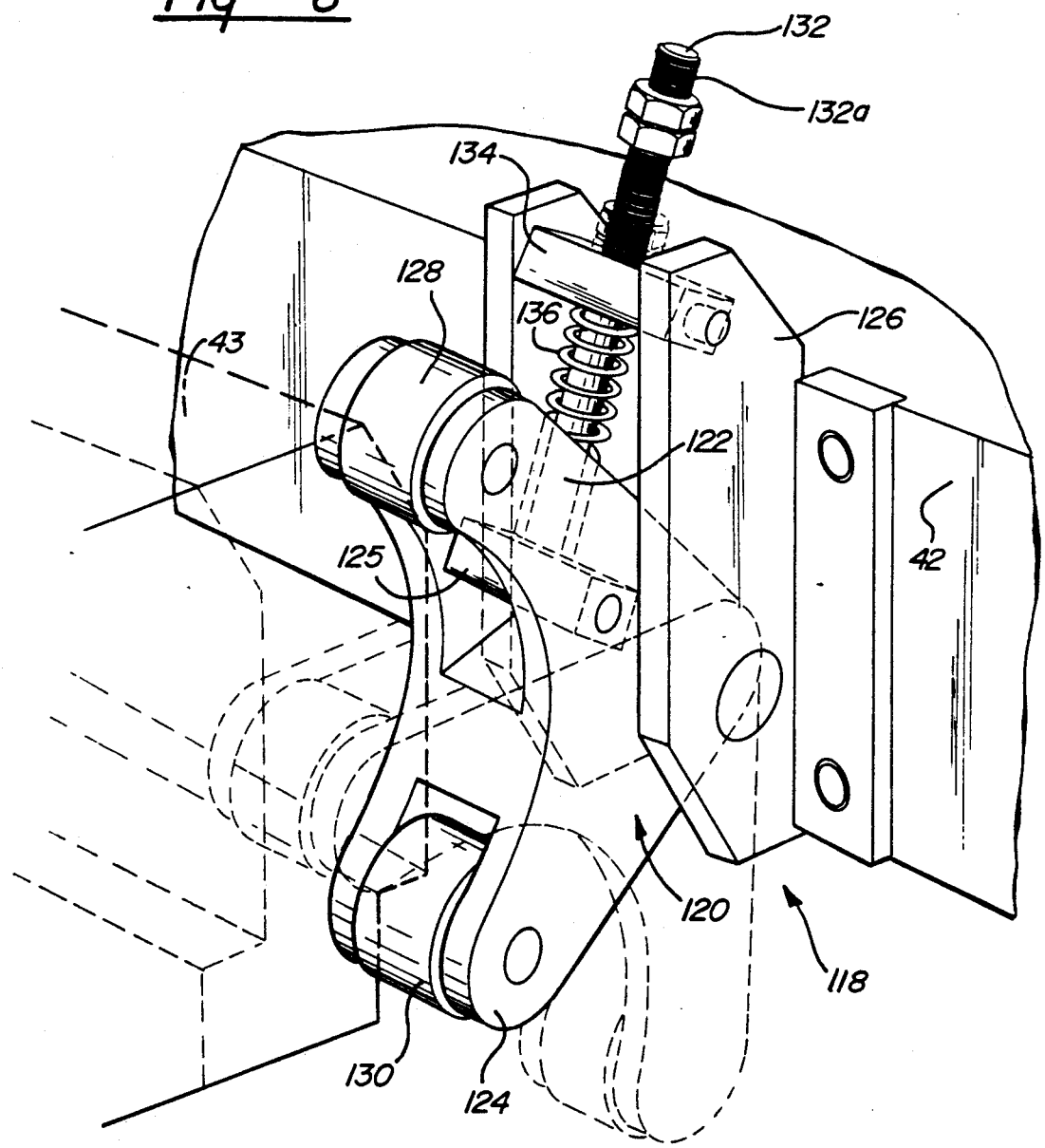

INDUCTION SEVERING APPARATUS

FIELD OF THE INVENTION

This invention relates generally to an induction severing machine used to sever an elongate workpiece into shorter lengths and more particularly concerns a machine for severing elongated tubular product as it continuously emanates from a fabrication mill.

BACKGROUND OF THE INVENTION

Typically, a flying shear, i.e. a severing device utilizing a shearing blade which travels with the workpiece, is used to sever sections from a continuously emitting workpiece. Shears of this type obtain the best results when used with relatively thin walled, small diameter workpieces and result in a rapid, clean-cut by the severing blade, leaving the workpiece end in a finished condition and eliminating the need for a recut operation. However, as the size and wall thickness of the workpiece increases, the stress developed during the cutting procedure also increases and becomes too great for a shear-type apparatus. Further, the increased stress results in a short blade life requiring costly tool replacement.

Alternate methods have been used to large diameter thick wall pipe, including saws, electrical arc or gas cutting. Again, these devices must travel with the workpiece during the cutting operation. The slow cutting speeds of these devices combined with the high rate of speed at which the pipe emanates from the mill, results in a long distance of travel to perform the cutting operation and a corresponding increase in mill space. Further, the minimum length of a section of pipe that may be severed is also increased, resulting in the need for a recut operation to obtain shorter lengths. Further, these devices are high maintenance devices which require constant maintenance; i.e., the replacement of saw blades, electrodes or gas.

It is known in the art to sever a metal workpiece into parts by contacting the workpiece with electrical contacts and supply high frequency electrical current through the contacts to heat the workpiece thereby reducing the tensile strength of the workpiece in the heated area. The workpiece may then be pulled apart in the heated area. See, for example, U.S. Pat. No. 4,916,278. However, there is a need for an apparatus to effectively sever a moving workpiece by heating the material to a temperature at which the tensile strength is substantially reduced and using a mechanical force to pull the workpiece apart.

Accordingly, it is an object of applicant's invention to provide a bladeless, quick and efficient severing means which travels with the workpiece during the severing operation, to sever large diameter, thick wall pipe without requiring a long carriage to support the severing means. Further, it is also an object of applicant's invention to eliminate any recut operation for reducing the pipe sections to shorter lengths.

Additionally, it is an object of the present invention to provide an apparatus for effectively heating the workpiece to reduce the tensile strength of the workpiece and a mechanical force to pull the workpiece apart in the heated area.

SUMMARY OF THE INVENTION

The present invention provides an apparatus for severing an elongate workpiece using induction heating to weaken the workpiece at a well-defined area, and subsequent mechanical force to sever the workpiece at the weakened area. In general, applicant's device includes means for clamping the workpiece at two spaced apart locations, means for heating an area of the workpiece between the clamps and means for increasing the axial spacing between the clamps, whereby the workpiece is severed in the heated area by pulling it apart.

Applicant's device is advantageously used to sever large diameter thick wall pipe, however it may be further used to satisfactory sever other workpieces such as tubing or solid stock of various shapes and sizes including round, oval, square or rectangular.

In accordance with a further aspect of the invention, the workpiece is passed through an induction coil situated between the two clamps. The induction coil heats the workpiece to a predetermined temperature after which the axial spacing between the clamps is increased by the cam means to sever the pipe in the heated area.

A further feature of the invention includes the use of a wedge-shaped cam member acting on at least one of said clamps to increase the axial spacing between the two clamps.

According to a second aspect, the present invention enables the bladeless severing of elongate workpieces on the fly; i.e., the severing apparatus, comprising the two clamps clamped to the workpiece at spaced apart location, the heating means and the cam means for increasing the axial spacing of the clamps moves with the workpiece during the severing operation. In general this is accomplished by supporting the severing apparatus on a set of rails adjacent and parallel to the longitudinal axis of the workpiece, propelling the severing apparatus; and activating the severing apparatus while it is moving in synchronous, clamped relationship to the workpiece.

A third aspect of the invention includes the provision and use of an overload mechanism in conjunction with the cam means protecting against catastrophic failure of the severing apparatus when the force applied to the cam means for increasing the actual spacing exceeds a predetermined amount as a result of a jammed condition.

According to a further feature, the overload mechanism includes a cam member releasably mounted and held in position by a spring means, whereby excessive force on the cam member overcomes the spring means and releases the cam member.

An additional aspect of the present invention includes the bladeless method of servering a workpiece into individual sections. The method includes clamping the workpiece to axially spaced apart locations and heating the workpiece to a predetermined temperature at a location between the clamps. Once the workpiece has been heated to the predetermined temperature, the axial spacing between the clamps is increased, resulting in the workpiece being severed in the heated area.

Another method aspect is the method for severing sections from a continuously emitting elongated workpiece on the fly. In accordance with this aspect, axially spaced apart clamps are accelerated from an initial, rest position to the speed of the workpiece, after which they are clamped to and travel with the workpiece. The workpiece is then heated between the clamps. After reaching a predetermined temperature, the axial spacing between the clamps is increased, severing the workpiece in the heated area. After the workpiece has been severed, the clamps are then returned to their initial, rest position in preparation for the next severing cycle.

The nature of my invention including several other features and advantages will become apparent from a reading of the following detailed description of the preferred embodiment.

DETAILED DESCRIPTION OF THE DRAWINGS

FIG. 8 is a perspective view of a hold open mechanism of the present invention; and FIG. 9 is a side, fragmentary view of an alternative hold open mechanism of the present invention.

DETAILED DESCRIPTION OF THE SPECIFIC EMBODIMENT

Figure 1:
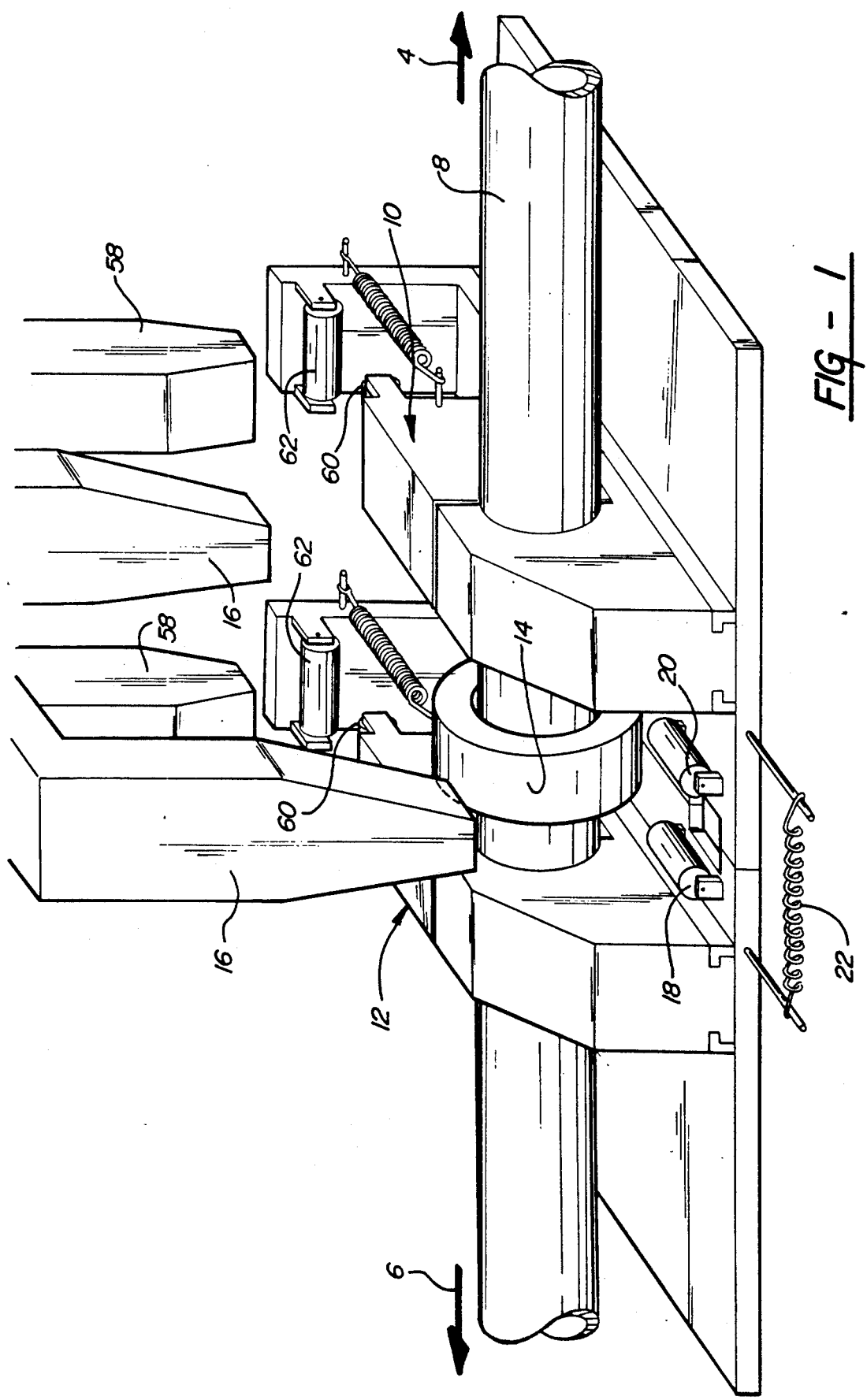
FIG. 1 is a schematic perspective view of a severing apparatus of the present invention.

Referring to FIG. 1, the present invention relates to a novel means for severing an elongated, large diameter thick wall workpiece 8 into manageable length sections. First and second clamping mechanisms 10,12 clamp the workpiece 8 at axially spaced apart locations. A heating means 14, positioned between the first and second clamping mechanisms 10,12 heats an area of the workpiece 8 to a temperature at which the tensile strength of the workpiece is substantially reduced. When the tensile strength of the workpiece 8 in the heated area is substantially reduced, a wedge-shape cam member 16 acting in cooperation with cam followers 18,20 increases the axial spacing between the first and second clamping mechanisms 10,12 by forcing the first and second clamping mechanisms 10,12 apart in the direction shown by the arrows 4,6. Increasing the axial spacing causes the workpiece 8 to be severed in the heated area by pulling it apart. Once the workpiece 8 is severed, the cam member 16 is withdrawn, the first and second clamping mechanisms 10,12 are unclamped and the severed section of the workpiece 8 is removed. The first and second clamping mechanisms 10 and 12 are then returned, by a return spring 22, to their initial axially spaced apart positions in preparation for the next severing cycle.

Figure 2:
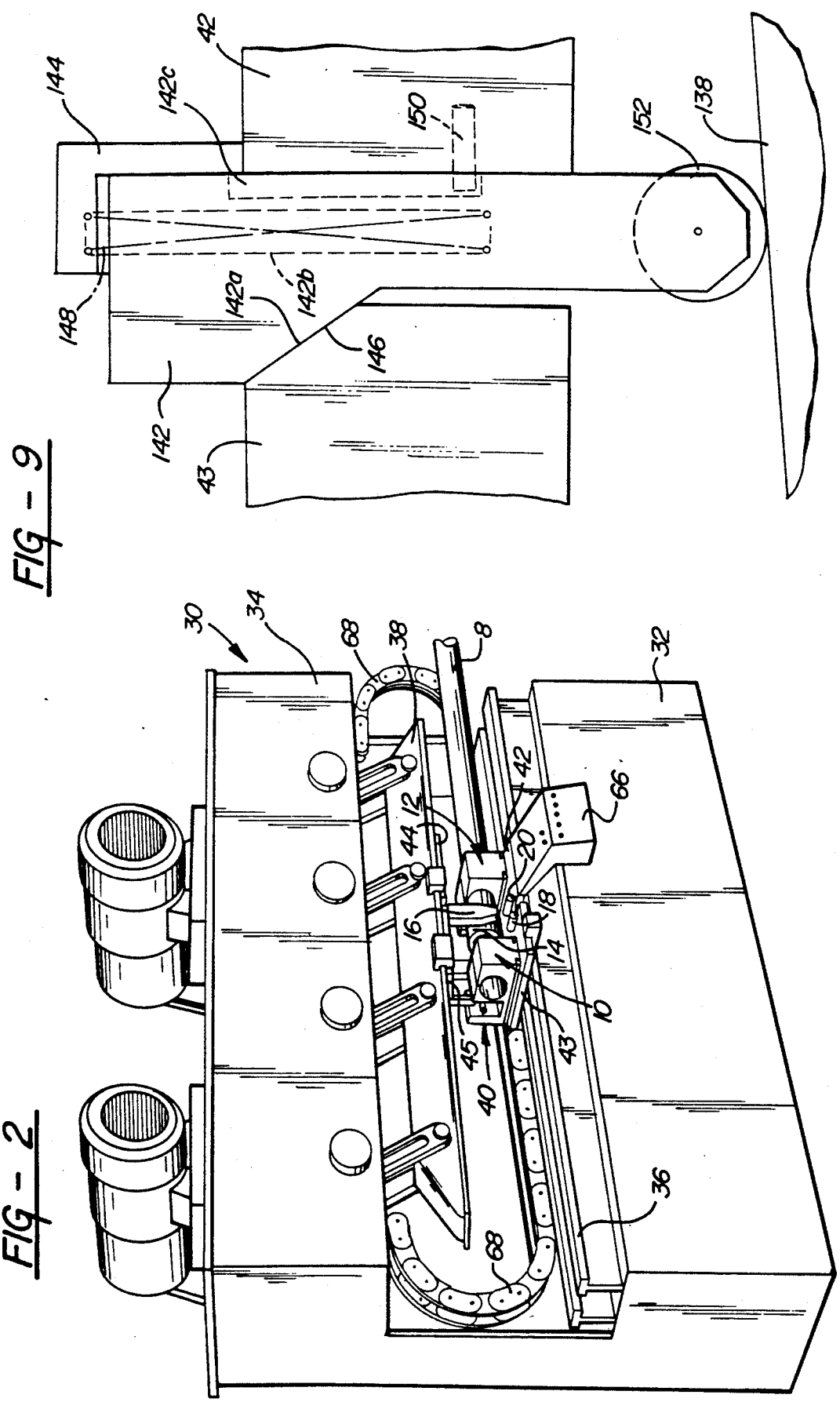
FIG. 2 is a perspective view of a severing machine incorporating the present invention.
Figure 3:
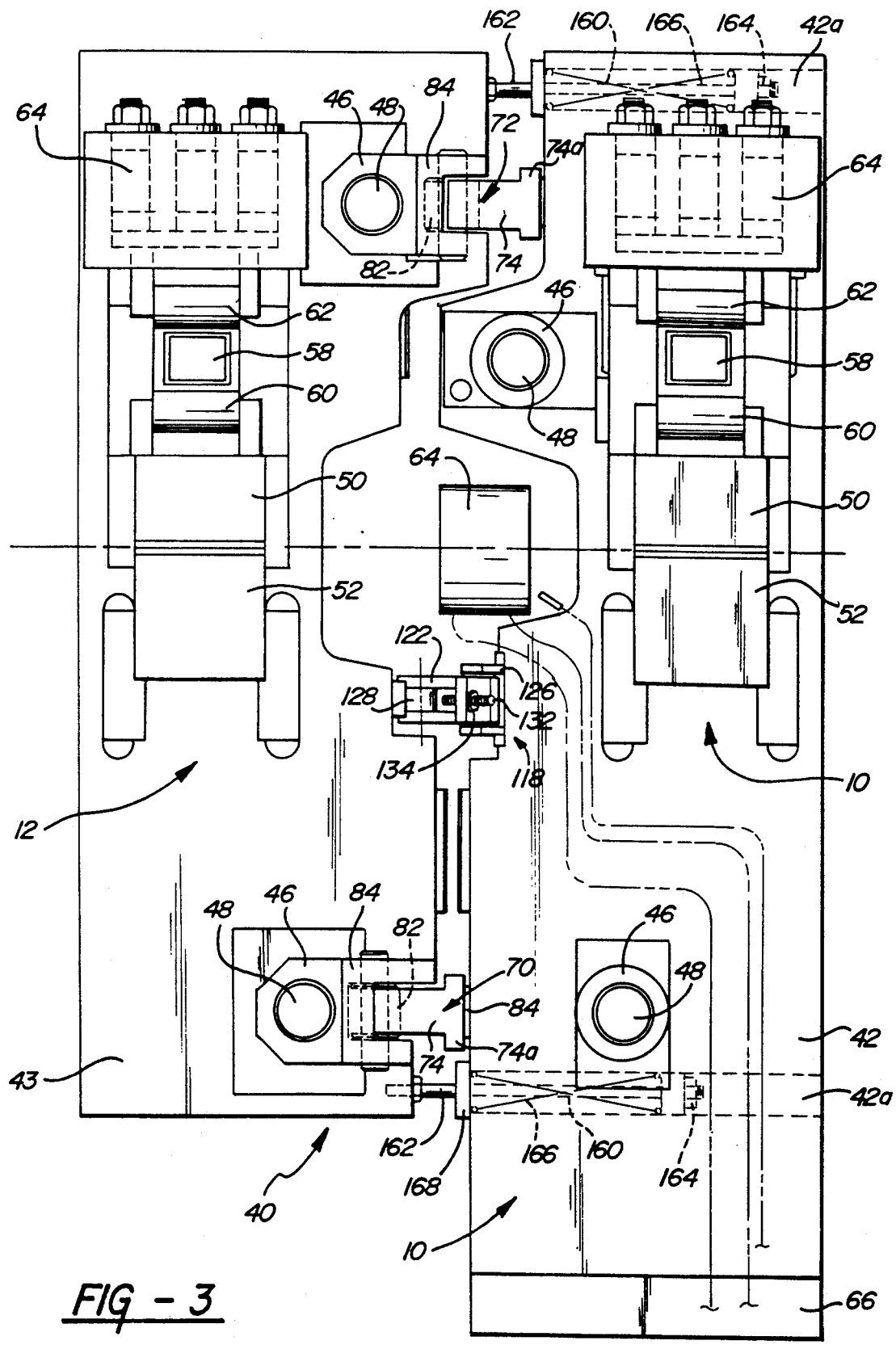
FIG. 3 is a plan view of the severing apparatus of the present invention with the upper platen removed for clarity.
Figure 4:
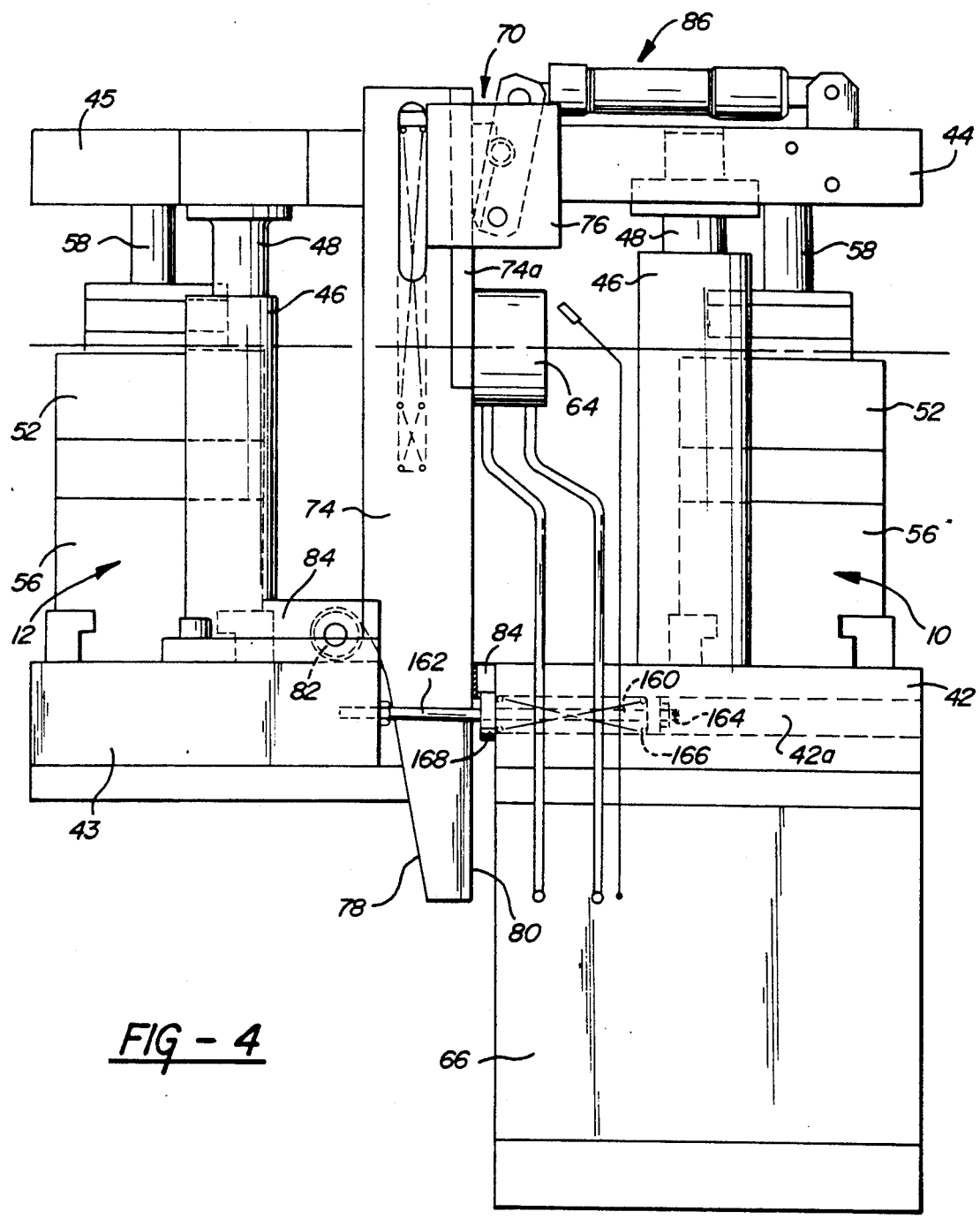
FIG. 4 is a front view of the severing apparatus of the present invention.
Figure 5:
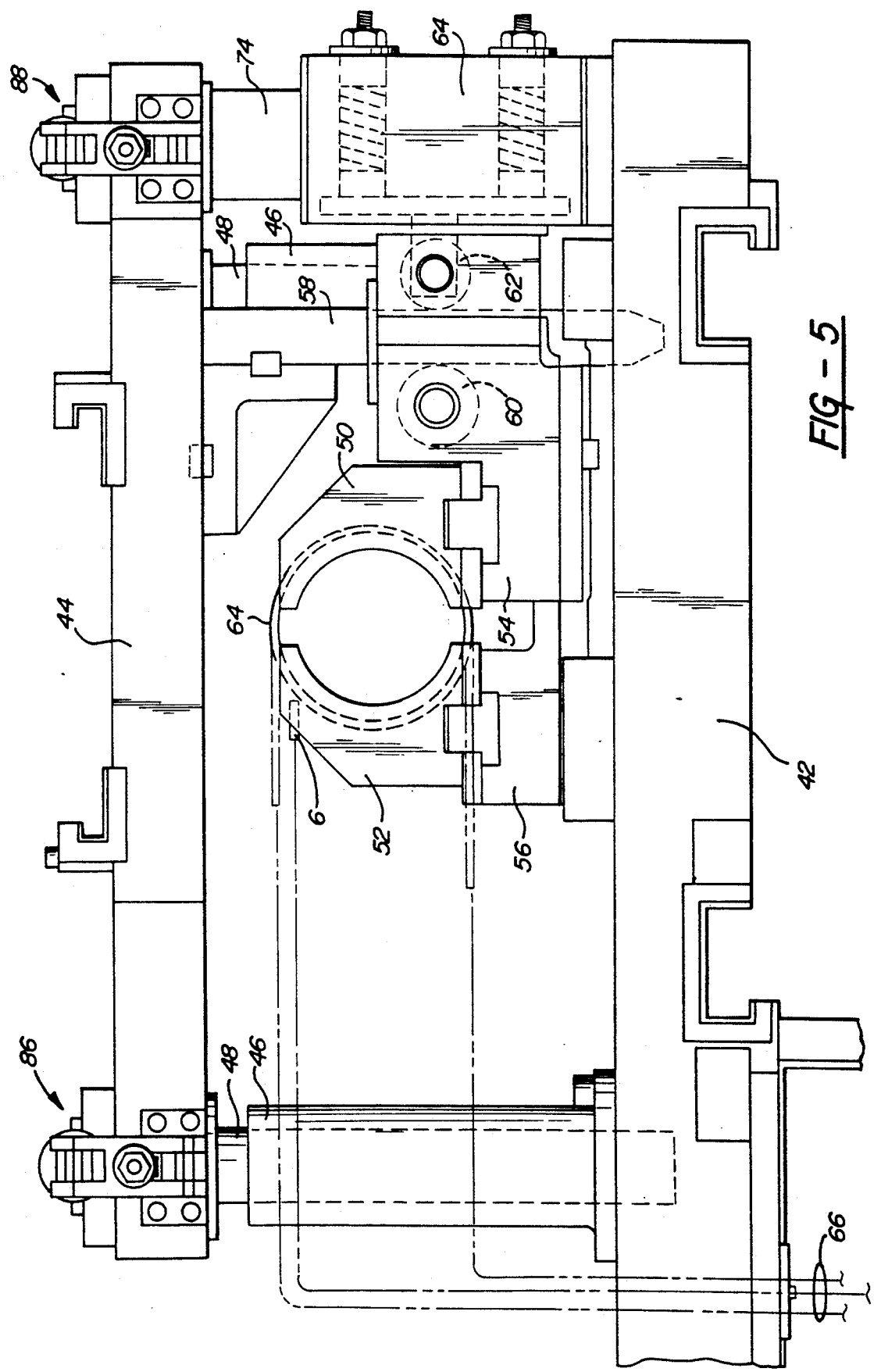
FIG. 5 is a side view of the present invention.
Figure 6:
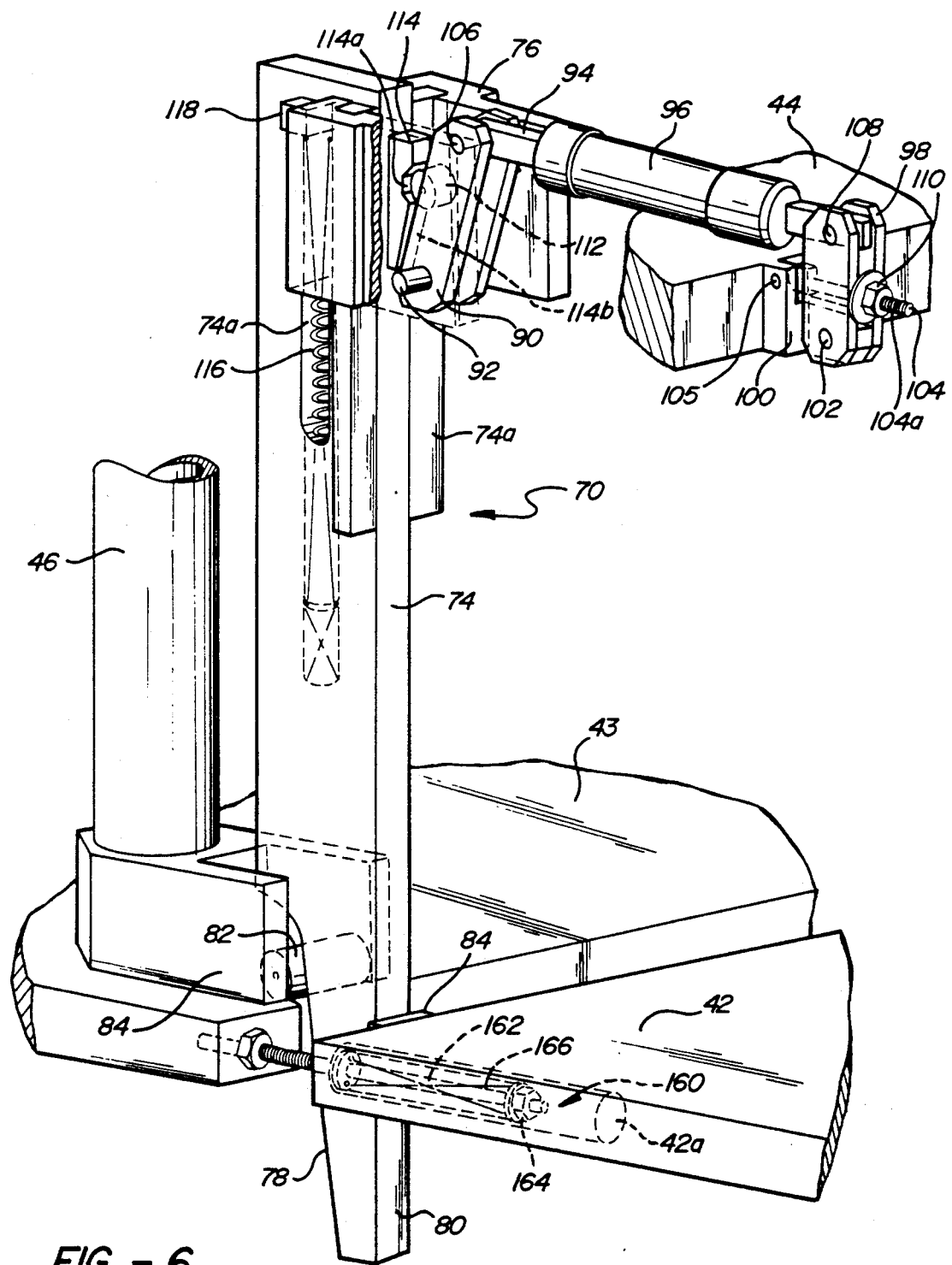
FIG. 6 is a perspective, fragmentary view of a parting means of the present invention.
Figure 7:
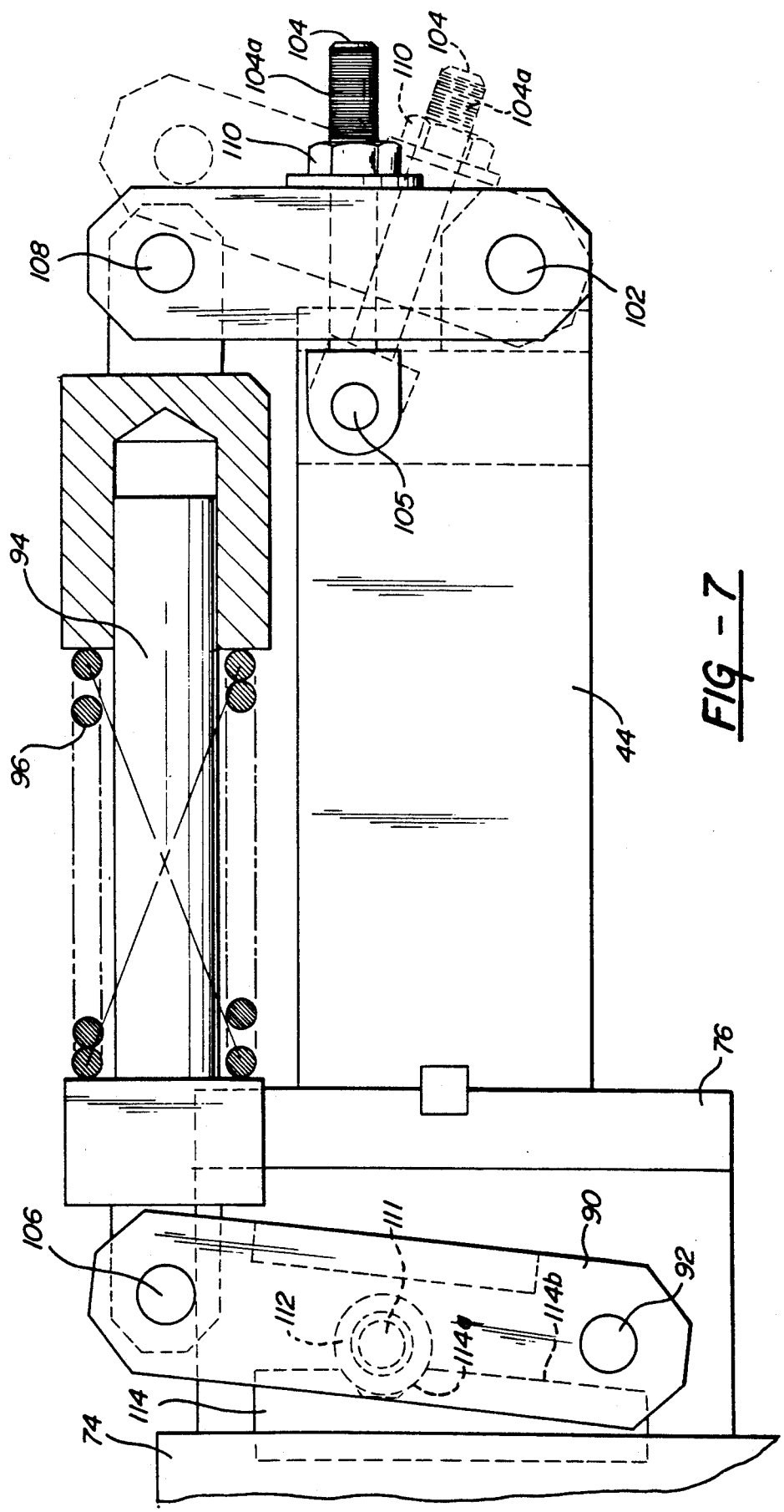
FIG. 7 is a front, fragmentary view of the overload mechanism of the present invention.

Turning now to FIG. 2, the specific embodiment of the present invention is shown for severing a continuously emitting elongated workpiece on the fly; i.e., the severing apparatus travels with the workpiece during the severing operation. FIG. 2 shows a flying induction severing machine comprising a press 30, which is preferably a large rigid wall frame structure having a base portion 32 and a head portion 34 positioned vertically over the base portion 32. The severing apparatus, seen generally at 40, is slidably mounted on a set of rails 36 secured to the press bed 32. The press includes a swinging or reciprocating ram 38 for operating the severing apparatus 40.

When severing a moving workpiece 8, the severing apparatus 40 is positioned, in this case, at the right side of the press 30 to receive the workpiece as it emanates from a fabrication mill. Prior to the severing stroke, the severing apparatus 40 is accelerated to the speed of the workpiece 8 by means of an accelerator (not shown) coupled to the severing apparatus 40. Accelerators have been used previously to accelerate shear-type cutters to the speed of the workpiece and are well known in the art. See U.S. Pat. No. 3,460,421, the disclosure of which is incorporated herein by reference.

Once the severing apparatus 40 has synchronized speed with the workpiece 8, the ram operates the first and second clamping mechanisms 10,12 which clamp the severing apparatus 40 to the moving workpiece 8. Downward motion of the ram 38 is suspended while the heating means 14 heats the workpiece 8 to reduce the tensile strength of the workpiece. When the tensile strength of the workpiece is substantially reduced, the ram 38 continues its downward stroke, causing the cam member 16, cooperating with the cam followers 18,20, to increase the axial spacing between the first and second clamping mechanisms 10,12, resulting in the severing of the workpiece 8 in the heated area. Following the severing operation, the ram 38 operating in a reverse manner retracts the cam member 16 and unclamps the first and second clamping mechanisms 10,12 from the workpiece. After the severing apparatus 40 has been unclamped from the workpiece 8, it is returned to its initial starting position by the accelerator in preparation for a new severing cycle.

Further details of presses of the type disclosed herein are known and may be found in U.S. Pat. Nos. 3,288,011, 3,288,012, 4,031,792, 4,228,706 and 4,964,325, the disclosures of which are herein incorporated by reference.

Referring now to FIGS. 3-8, a specific embodiment of the severing apparatus 40 is shown for severing 6⅝ inch diameter 1020 steel pipe, having a wall thickness of ¼ inch, and emanating from a fabrication mill at a rate of 60-70 feet per minute, on the fly.

The severing apparatus 40 comprises first and second clamping mechanisms 10,12. Since the first and second clamping mechanisms 10,12 are substantially similar, only the first clamping mechanism 10 is discussed for illustrative purposes. Clamping mechanism 10 comprises a lower platen 42 slidably mounted to the rails 36 and an upper platen 44 slidably mounted to the ram 38. The upper platen 44 and lower platen 42 are interconnected for relative reciprocal movement during the severing operation by guide bushings 46 and pins 48. A pair of die jaws 50,52, each having a complementary inner surface conforming to the workpiece contour, are mounted on the lower platen 42 by upper and lower die jaw holders 54,56 slidably mounted on one another. The die jaws 50,52 are reciprocated toward and away from each other in synchronism with the movement of the upper 44 and lower 42 platens by coaction of a die jaw cam 58 passing between a pair of clamping rollers 60,62 carried respectively by the upper 54 and lower 56 die jaw holders. The first clamping mechanism 10 further includes an overload mechanism 64 for use in preventing a catastrophic failure should the die jaws 50, 52 be prevented from fully closing due to an obstruction.

Clamping mechanisms of this type have been used previously in a flying shear apparatus and will not be further described since the mechanism is known. Further details of the clamping mechanisms of this type may be found in U.S. Pat. Nos. 4,108,029, 4,294,147, 4,392,644 and 4,437,374, the disclosures of which are incorporated herein by reference.

Once the first and second clamping mechanisms 10,12 have been clamped to the workpiece 8 at axially spaced apart locations, an area of the workpiece between the first and second clamping mechanisms 10,12 is heated to a temperature at which the tensile strength of the workpiece is substantially reduced. A 500 kilowatt, 1-2 kilohertz variable frequency single turn induction coil 65 is used to heat a 1 inch wide section of the workpiece 8 to a temperature of 2200° F. A temperature probe 66 placed adjacent the heated area monitors the surface temperature of the workpiece 8. The temperature probe 63 senses when the outer diameter of the workpiece has reached 2200° F. and sends an appropriate signal to a microprocessor which reduces the power to the induction coil 65 to maintain an outer diameter surface temperature of 2000° F.

After the outer diameter temperature of the workpiece reaches 2200° F., the microprocessor waits for approximately 7 seconds to allow the heat to soak into the workpiece 8 before sending a signal to the ram 38 to cycle through the severing stroke. The 2200° F. heat temperature and 7 second soak time as used herein, for 6⅝ diameter, ½ inch wall, 1020 steel pipe, were empirically determined as sufficient for substantially reducing the tensile strength of the workpiece. Further, a 5 second soak time at a 2200° F. outer diameter temperature was also empirically determined as suitable for substantially reducing the tensile strength of a 3 inch outer diameter, ½ inch wall, 1020 steel pipe. The outer diameter temperature and soak time may be varied depending upon the size and type of material to be severed.

The induction coil 65 is wired to a secondary transformer 66 mounted adjacent the lower platen 42 of the first clamping mechanism 10. Power supplied to the secondary transformer 66 by means of electric cables supported by cable carriers 68 connected to the first and second clamping mechanisms 10,12 slidably mounted on the rails 36 (see FIG. 2).

The first and second clamping mechanisms 10,12 are physically separated; i.e., the axial spacing between the clamping mechanisms is increased, by cam assemblies 70,72. Since the cam assemblies 70,72 are substantially similar, only the first cam assembly 70 is discussed for illustrative purposes.

Cam assembly 70 comprises a cam member 74, having a T-shaped upper portion 74a slidably secured in a guideway 76 mounted to the upper platen 44 of the first clamping mechanism 10. The guideway 76 supports and guides the cam member 74 during the severing operation. The cam member 74 has a cam surface 78 and a support surface 80. A cam follower 82 is secured by a follower support 85 secured to the lower platen 43 of the second clamping mechanism 12 opposite said cam surface 78. A support plate 84 is mounted to the lower platen 42 of the first clamping mechanism 10 opposite the support surface 80 of the cam member 74.

In operation the downward stroke of the ram 38 causes the upper platen 44 of the first clamping mechanism 10 and the cam member 74 to move downward resulting in a wedging action between the cam follower 82 and the support plate 84 causing the second clamping mechanism 12 to be forced outward; i.e., away from the first clamping mechanism 10, whereby the axial spacing between the first and second clamping mechanisms 10,12 is increased.

The cam surface of the specific embodiment as disclosed herein has approximately a 7° angle and length of approximately 12 inches, resulting in an axial separation of the first and second clamping mechanisms 10,12 of approximately 1½ inches. Other cam angles and lengths may be used to change the increase in axial spacing during the severing operation, depending upon the size and type of the workpiece.

Overload mechanisms 86,88 are used in cooperation with each of the cam assemblies 70,72. As each of the overload mechanisms 86,88 are substantially similar, only the first overload mechanism 86 is discussed for illustrative purposes.

The overload mechanism 86 is secured to the upper platen 44 of the first clamping mechanism 10 and is used to provide a means for preventing catastrophic failure should the workpiece fail to sever for whatever reason; e.g., failure of the heating means during the downward stroke of the ram 38.

The overload mechanism 86 includes a front lever arm 90 pivotally mounted on a rod 92 secured to the guideway 76. A connecting rod 94, including a spring pack 96 interconnects the front lever arm 90 with a rear lever arm 98 by pins 106,108. The rear lever arm 98 is pivotally mounted to a rear bracket 100 by a pin 102. A locking rod 104 is pivotally mounted to the rear bracket 100 by a pin 105 and extends through the rear lever arm 98 between the pivot pins 102 and 108. The locking rod 104 has a threaded end portion 104a for receiving lock nut 110. A roller 112 is mounted by pivot pin 111 to the front lever arm 90. The roller 112 is of sufficient diameter to engage a notch 114a located on a retaining block 114 which is mounted to the cam member 74.

The locking rod 104 enables the operator to assemble the overload mechanism 86 and compress the spring pack 96. As shown in dotted lines in FIG. 7, loosening the lock nut 110 on the locking rod 104 releases the compressive force of the spring pack 96, enabling the spring pack 96 to be removed. The spring pack 96 may be installed by placing it on the connecting rod 94 and tightening the lock nut 110 on the lock rod 104 to a position shown by the solid lines in FIG. 7, whereby the force of the compressed spring pack 96 urges the roller 112 into engagement with the notch 114a on the retaining block 114.

A return spring 116 secured in a bore 74b in the cam member 74 and engaging a gib 119 mounted to the guideway 76 is used to provide a positive means to reset the cam assembly to the severing position after the cam assembly has been placed in the overload mode; i.e., the roller 112 has been disengaged from the notch 114a on the retaining block 114.

The overload mechanism of the present invention works as follows. As the ram 36 begins its downward stroke, the cam surface 78 and support surface 80 of the cam member 74 engages the cam follower 82 and the support plate 84 resulting in a wedging action which separates the first and second clamping mechanisms 10,12. If, for whatever reason, the travel of the cam member 74 is impaired, the roller 112 of the overload mechanism 86 will be forced from the notch 114a of the retaining block 114, and travel down the inclined surface 114b of the retaining block 114, allowing the upper platens 44,45 of the first and second clamping mechanisms 10,12 to continue downward while the cam member 74 remains stationary, sliding in the guideway 76 and compressing the return spring 116. After the ram 38 completes the downward stroke and returns the upper platens 44,45 of the first and second clamping mechanisms 10,12 to their initial position, the weight of the cam member 74 coupled with the compressive force of the return spring 116 causes the roller to travel up the inclined surface 114b of the retaining block 114 into engagement with the notch 114a, thereby resetting the overload mechanism 86 in preparation for the next severing stroke.

After the cam assemblies 70,72 have increased the axial spacing between the first and second clamping mechanisms 10,12, thus severing the workpiece, a hold-open mechanism 118 (see FIGS. 8,9) is used to keep the clamping mechanisms 10,12 separated during the return of the severing apparatus 40 to its initial position on the rails 36 in preparation for the next severing stroke. The purpose of the hold-open mechanism 118 is to keep the first and second clamping mechanisms 10,12 separated while the first and second clamping mechanisms are unclamped, allowing the workpiece to be removed from the severing apparatus 40, thereby preventing the hot ends of the freshly severed workpiece from touching each other and possibly reconnecting.

Referring to FIG. 8, the hold-open mechanism 118 includes an L-shaped hold member 120 having equal length upper and lower leg portions 122,124 pivotally mounted at its mid point to a bracket 126 secured to the lower platen 42 of the first clamping mechanism 10. Roller means 128,130 are mounted to the ends of each of the leg portions 122,124. A rod 132 having a threaded portion 132a is connected to pivotal member 125 mounted to the upper leg portion 122 at one end and slidably mounted in the bracket 134 at the opposite end. A lock nut 133 placed in the threaded portion 132a limits the angular travel of the hold member 120. A spring 136 secured over the rod 132 between pivotal member 125 and the bracket 134 and urges the roller 128 mounted to the upper leg portion 122 into engagement with the lower platen 43 of the second clamping mechanism 12 when the first and second clamping mechanisms 10 and 12 have been separated by the cam assemblies 70,72 as shown by the dotted lines. A cam track 138 mounted in the press base (see FIG. 9), adjacent the initial start position of the severing apparatus 40, engages the roller 130 mounted to the lower leg portion of the hold member 120 to release the hold-open mechanism 118 from the hold-open position.

An alternative hold-open means 140 is shown in FIG. 9, comprising a cam member 142 slidably mounted in a bracket 144 secured to the lower platen 42 of the first clamping mechanism 10. The cam member 142 includes a cam face 142a which engages a similar cam face 146 existing on the lower platen 43 of the second clamping mechanism 12. The cam member 142 is biased in a downward direction by a spring 148 mounted in a bore 142b located in the cam member 142, and engaging the bracket 144. Travel of the cam member 142 is limited by a stop pin 150, secured to the lower platen 42 of the clamping mechanism 10, which engages a cam groove 142c located on the cam member 142. A roller 152 mounted to the lower portion of the cam member 142 engages the cam track 138 found in the press bed adjacent to the initial starting position of the severing apparatus 40 to force the cam member 142 upward, enabling the first and second clamping mechanisms 10,12 to be returned to their initial position.

A spring return assembly 160 interconnects the first and second clamping mechanisms 10,12 and is used to return the clamping mechanisms 10,12 to their initial position prior to reclamping the workpiece 8 for the next severing cycle. The spring return assembly 160, see FIGS. 3, 4 and 6, includes a return rod 162 threadably engaged in the lower platen 43 of the second clamping mechanism 12. The return rod 162 extends into a bore 42a on the lower platen 42 of the first clamping mechanism 10 and engages a return spring 166 held within the bore 43a by a retainer plate 168. A lock nut 164 is attached to the retaining rod 162 and holds the return spring 166 between the retaining plate 168 and the lock nut 164. In operation, when the first and second clamping mechanisms 10,12 are separated, the return spring 166 is compressed. Once the hold-open mechanism 118 engages the cam track 138 and is released, the return spring 166 acting upon the lock nut 164 of return rod 162 causes the first and second clamping mechanisms 10,12 to be pulled back to their initial adjacent positions in preparation for the next severing cycle.

The described severing operation for severing large diameter, heavy walled pipe will be seen to provide smooth, efficient means in which to quickly and effectively sever the workpiece into the required length sections. Although a specific embodiment of the invention has been illustrated and described in detail, it will be apparent that various changes may be made in the disclosed embodiment without departing from the scope or spirit of the invention. Moreover, the terms "up" and "down" are used herein in a relative sense and do not suggest any given orientation of the mechanism described and placed into actual use.

We claim:

1. An apparatus for severing a workpiece having a longitudinal axis comprising:
   first and second clamping means for selectively clamping a workpiece at spaced apart positions along said axis;
   heating means, including an induction coil through which the workpiece passes, for heating an area of the workpiece at a location between said first and second clamping means to a temperature at which the tensile strength of the workpiece is substantially reduced;
   cam means for increasing the axial spacing between said first and second clamping means whereby the workpiece is severed in the heated area; and
   power supply means for energizing said induction coil.

2. An apparatus for severing a workpiece having a longitudinal axis comprising:
   first and second clamping means for selectively clamping a workpiece at spaced apart positions along said axis;
   heating means for heating an area of the workpiece at a location between said first and second clamping means to a temperature at which the tensile strength of the workpiece is substantially reduced;
   cam means for increasing the axial spacing between said first and second clamping means whereby the workpiece is severed in the heated area;
   a temperature probe mounted adjacent the workpiece for monitoring the temperature of the workpiece; and
   monitoring means connected to said temperature probe for monitoring the output of the temperature probe and reducing power to the induction coil when the workpiece reaches the temperature at which the tensile strength of the workpiece is substantially reduced.

3. An apparatus according to claim 2 wherein the heating means is operable to heat the workpiece such that the exterior temperature of the workpiece is between 1600° F. and 2400° F.

4. An apparatus for severing a workpiece having a longitudinal axis comprising:
 first and second clamping means for selectively clamping a workpiece at spaced apart positions along said axis;
 heating means for heating an area of the workpiece at a location between said first and second clamping means to a temperature at which the tensile strength of the workpiece is substantially reduced; and
 cam means for increasing the axial spacing between said first and second clamping means whereby the workpiece is severed in the heated area;
 each of said first and second clamping means comprising a support, first and second slide means mounted on said support for movement transverse the longitudinal axis of the workpiece, a pair of complemental die jaws mounted on said first and second slide means for movement between an opened released position and a closed clamped position, first and second cam followers mounted to said first and second slide means, and camming means engaging said first and second cam followers for urging said die jaws into the opened released position and the closed clamped position.

5. An apparatus for severing a workpiece having a longitudinal axis comprising:
 first and second clamping means for selectively clamping a workpiece at spaced apart positions along said axis;
 heating means for heating an area of the workpiece at a location between said first and second clamping means to a temperature at which the tensile strength of the workpiece is substantially reduced; and
 cam means for increasing the axial spacing between said first and second clamping means whereby the workpiece is severed in the heated area;
 each of said first and second clamping means comprising a support, a pair of complemental die jaws mounted on said support for movement between an opened released position and a closed clamped position, and actuating means for moving said die jaws between the open released position and the closed clamped position;
 said support including first and second portions slidably mounted for relative reciprocal motion parallel to the longitudinal axis of the workpiece; and
 said first clamping means being fixed to said first portion and said second clamping means being fixed to said second portion.

6. An apparatus according to claim 5 wherein said cam means comprises a cam having at least one cam face driven between said first and second support portions whereby the axial spacing between the first and second clamping means is increased.

7. An apparatus for severing a workpiece having a longitudinal axis comprising:
 first and second clamping means for selectively clamping a workpiece at spaced apart positions along said axis;
 heating means for heating an area of the workpiece at a location between said first and second clamping means to a temperature at which the tensile strength of the workpiece is substantially reduced; and
 cam means, including a cam member having at least one cam face acting on one of said first and second clamping means, for increasing the axial spacing between said first and second clamping means whereby the workpiece is severed in the heated area.

8. An apparatus according to claim 7 wherein said cam member is associated with said first clamping means and coacts with a cam follower associated with said second clamping means to increase the axial spacing between said first and second clamping means.

9. An apparatus according to claim 7 wherein said cam means further includes an overload means for shifting said cam means to an overload position when the force imposed upon said cam means exceeds the force necessary to sever the workpiece.

10. An apparatus according to claim 9 wherein said overload means comprises a guideway associated with one of said clamping means;
 said cam means, having a notched portion thereon, slidably mounted in said guideway;
 a bracket mounted to said clamping means adjacent said cam means;
 a lever arm pivotally mounted on said bracket;
 a roller means mounted on said lever means for engagement with said notched portion; and
 biasing means acting on said lever arm for biasing said roller means into engagement with said notched portion.

11. An apparatus for severing a workpiece having a longitudinal axis comprising:
 first and second clamping means for selectively clamping a workpiece at spaced apart positions along said axis;
 heating means for heating an area of the workpiece at a location between said first and second clamping means to a temperature at which the tensile strength of the workpiece is substantially reduced;
 cam means for increasing the axial spacing between said first and second clamping means whereby the workpiece is severed in the heated area; and
 return means for returning said first and second clamping means to an initial axially spaced apart position.

12. An apparatus according to claim 11 wherein said return means comprises a spring interconnecting said first and second clamping means.

13. An apparatus according to claim 11 further including a holding means for holding said first and second clamping means at an increased axial spaced apart location; and
 release means for releasing said holding means enabling said return means to return said first and second clamping means to the initial axial spaced apart location.

14. An apparatus according to claim 13 wherein said holding means comprises:
 a lever means pivotally mounted to said first clamping means operable to engage said second clamping means; and
 biasing means to bias said lever means into engagement with said second clamping means when the axial spacing between the first and second clamping means is increased whereby said holding means maintains the increased axial spacing between said first and second clamping means after the cam means is withdrawn.

15. An apparatus according to claim 14 wherein said holding means comprises:
- a holding block slidably mounted to said first clamping means operable to engage said second clamping means; and
- biasing means for biasing said holding block into engagement with said second clamping means when the axial spacing between said first and second clamping means is increased whereby the axial spacing between said first and second clamping means is maintained after the cam means is withdrawn.

16. An apparatus for severing a continuously emitting elongate workpiece having a longitudinal axis comprising:
- a press comprising a frame having a base portion, a head portion positioned over said base portion, a ram mounted for reciprocal motion on said head portion, and a pair of rails parallel to the axis of the workpiece, mounted in said base portion;
- support means mounted on said rails for movement therealong;
- first and second clamping means for selectively clamping the workpiece at initial spaced apart positions along said axis;
- heating means mounted on said support means for heating an area of the workpiece at a location between said first and second clamping means to a temperature at which the tensile strength of the workpiece is substantially reduced; and
- parting means mounted on said support means and operable by said ram for increasing the axial space between said first and second clamping means whereby said first and second clamping means are separated and the workpiece is severed.

17. An apparatus according to claim 16 wherein said support means comprises:
- first and second platens interconnected for relative reciprocal movement by a guide bushing secured to one of said platens and a pin mounted to said other platen engaging said guide bushing.

18. An apparatus according to claim 17 wherein said clamping means comprises:
- first and second slide means, having a pair of opposed complemental die jaws mounted thereon, mounted on said first platen for movement between an open released position and a closed, clamped position;
- first and second cam followers mounted to said first and second slide means; and
- clamping cam means mounted to said second platen engaging said first and second cam followers for selectively urging said complemental die jaws into an open, released position or a closed, clamped position.

19. An apparatus according to claim 16 wherein said parting means comprises:
- cam means associated with said support means for acting on at least one of said clamping means to increase the axial spacing between said first and second clamping means.

20. An apparatus according to claim 19 wherein said cam means comprises:
- a cam follower mounted to said support means adjacent said second clamping means; and
- a cam member mounted to said support means adjacent said first clamping means engaging said cam follower.

21. An apparatus according to claim 20 wherein said cam member has first and second opposite operative cam faces, said first cam face skewed with respect to the longitudinal axis of said cam member engaging said cam follower and said second cam face engages said first clamping means whereby reciprocation of said cam member wedges the first and second clamping means apart thereby increasing the axial spacing in between said first and second clamping means.

22. An apparatus according to claim 19 wherein said cam means further includes an overload means for shifting said cam means to an overload position when the force imposed upon said cam means exceeds a predetermined amount.

23. An apparatus according to claim 22 wherein said overload means comprises:
- a guideway associated with said support means;
- said cam means, having a notched portion thereon, slidably mounted in said guideway;
- a bracket mounted to said clamping means adjacent said cam means;
- a lever means pivotally mounted on said bracket;
- a roller means mounted on said lever means operable to engage said notch portion of the cam means; and
- a biasing means acting on said lever means, for biasing said roller means into engagement with said notched portion on said cam means.

24. An apparatus according to claim 16 further comprising a return means for returning said first and second clamping means to their initial spaced apart positions after said axial space has been increased by said parting means.

25. An apparatus according to claim 24 wherein said return means includes a spring means interconnecting said first and second clamping means.

26. An apparatus according to claim 16 including a holding means mounted on said support means for holding said first and second clamping means at an increased axial spaced apart position; and
- release means for releasing said holding means whereby said first and second clamping means may be returned to an initial axially spaced position.

27. An apparatus according to claim 26 wherein said holding means includes a lever means pivotally mounted to said support means operable to engage said second clamping means; and
- biasing means to bias said lever means into engagement with said second clamping means when the axial spacing between said first and second clamping means is increased whereby the axial spacing between said first and second clamping means remains constant after the parting means has been withdrawn.

28. The method of severing a section from a continuously emitting elongated workpiece emitting at a determinable speed comprising the steps of:
- accelerating first and second clamps from an initial rest position to the speed of the emitting workpiece;
- clamping said first and second clamps to the workpiece at initial spaced apart positions;
- heating said workpiece between said first and second clamps to a temperature at which the tensile strength of the workpiece is substantially reduced; and increasing the axial spacing between said first and second clamps whereby the workpiece is severed in the heated area.

29. The method of claim 28 further comprising:

the step of holding said first and second clamps at the increased axial spacing;

unclamping said first and second clamps from said workpiece;

returning said clamps to the initial at rest position; and releasing the hold and returning said first and second clamps to their initial axial spacing.

* * * * *